(12) United States Patent
Li

(10) Patent No.: US 10,994,942 B1
(45) Date of Patent: May 4, 2021

(54) MULTI-STATION CONVEYING EQUIPMENT

(71) Applicant: CITIC Dicastal Co., LTD, Qinhuangdao (CN)

(72) Inventor: Naili Li, Qinhuangdao (CN)

(73) Assignee: CITIC DICASTAL Co., LTD, Qinhuangdao (CN)

( * ) Notice: Subject to any disclaimer, the term of this patent is extended or adjusted under 35 U.S.C. 154(b) by 0 days.

(21) Appl. No.: 16/746,938

(22) Filed: Jan. 19, 2020

(30) Foreign Application Priority Data

Oct. 23, 2019 (CN) .......................... 201911012044.5

(51) Int. Cl.
| | |
|---|---|
| B65G 25/10 | (2006.01) |
| B65G 13/00 | (2006.01) |
| B65G 47/82 | (2006.01) |
| B65G 35/06 | (2006.01) |
| B65G 41/00 | (2006.01) |
| B65G 39/18 | (2006.01) |

(52) U.S. Cl.
CPC ............. *B65G 25/10* (2013.01); *B65G 13/00* (2013.01); *B65G 39/18* (2013.01); *B65G 41/006* (2013.01); *B65G 2812/12* (2013.01)

(58) Field of Classification Search
None
See application file for complete search history.

(56) References Cited

U.S. PATENT DOCUMENTS

| | | | | |
|---|---|---|---|---|
| 4,411,355 A * | 10/1983 | Furlette | .................. | B65G 25/10 198/718 |
| 4,476,973 A * | 10/1984 | Kessler | .................. | B65G 25/10 198/744 |
| 4,603,770 A * | 8/1986 | Hartness | ................ | B65G 25/10 198/345.3 |
| 8,061,526 B2 * | 11/2011 | Henderson | ............. | B65G 47/44 209/518 |
| 8,757,362 B2 * | 6/2014 | Ono | ....................... | B65G 25/10 198/737 |

* cited by examiner

*Primary Examiner* — Kavel Singh

(57) ABSTRACT

The disclosure relates to multi-station conveying equipment which comprises a driving device, a conveyance coupling device and a station combination device, wherein the station combining device includes a plurality of conveying station mechanisms arranged side by side in proper order corresponding to a plurality of stations, wherein each conveying station mechanism is suitable for placing and supporting a material frame; the driving device can drive the plurality of material frames on the plurality of conveying station mechanisms to synchronously move through the conveyance coupling device; and the conveyance coupling device comprises at least one set of drawstring shifting fork mechanism. The driving device drives the drawstring shifting fork mechanism to reciprocate, and drives the material frame to move forward simultaneously. The electric system and the mechanical system in the existing conveying mechanism are simplified, the manufacturing cost and the energy consumption of the equipment are reduced, fault points are reduced.

5 Claims, 3 Drawing Sheets

MULTI-STATION CONVEYING EQUIPMENT

CROSS-REFERENCE TO RELATED APPLICATIONS

The present application claims the priority of Chinese patent application No. 201911012044.5, filed on Oct. 23, 2019, which is hereby incorporated by reference in its entirety.

TECHNICAL FIELD

The disclosure relates to a multi-station conveying equipment, and is particularly applied to the technical field of fluorescence detecting equipment.

BACKGROUND

In the casting production process of the aluminum alloy parts, the castings after heat treatment need surface crack detection, which generally uses fluorescence detecting equipment to nondestructively detect the surface of the castings. During fluorescence detection, a casting is placed in a standard material frame, the casting is respectively subjected to a plurality of stations such as infiltration (the casting is soaked in fluorescent liquid), dripping, soaking, spraying and drying, stays at the stations for an equal time, and finally enters a darkroom, so that an operator uses a purple light lamp to detect the surfaces of the workpiece one by one. A driving mechanism is needed to execute the conveyance of the material frame between each station. The existing driving mechanism consists of a drive motor and a sprocket chain mechanism, wherein each station is equipped with the drive motor and the sprocket chain mechanism, and each station is independently driven. The existing driving mechanism has the disadvantages of high equipment manufacturing cost, high equipment energy consumption, relatively complex electric control and mechanical systems, and multiple equipment fault points. In addition, the independent driving mechanism adopts a one-by-one feeding mode, namely, when the material frame moves forwards, the material frame needs to wait for the material frame of the previous station to move out and then move forwards, otherwise, the problem that the phenomenon such as material frame slipping or being blocked leads to stacking and dislocation of two material frames will happen. The mode of feeding one by one leads to the beat to be prolonged, so that the work efficiency of equipment is reduced.

SUMMARY

The object of the present disclosure is to provide a multi-station conveying device to overcome the defects in the prior art. Specifically, the disclosure aims to provide a reciprocating drawstring type pneumatic synchronous conveying mechanism, which solves the problems of high equipment manufacturing cost, high equipment energy consumption, relatively complex electric control and mechanical systems, multiple fault points, slow beat of a one-by-one feeding mode and the like of the conventional driving mechanism.

In order to achieve the above object, the present disclosure provides the following technical solutions:

the disclosure provides a multi-station conveying equipment, including a driving device, a conveyance coupling device and a station combining device, characterized in that the station combining device includes a plurality of conveying station mechanisms arranged side by side in proper order corresponding to a plurality of stations, wherein each conveying station mechanism is suitable for placing and supporting a material frame; the driving device has a fixing portion fixed relative to the conveying station mechanism and a moving portion reciprocable relative to the fixing portion, and the moving portion can drive a plurality of material frames on the plurality of conveying station mechanisms to move synchronously through the conveyance coupling device; the conveyance coupling device comprises at least one set of drawstring shifting fork mechanism, wherein the drawstring shifting fork mechanism comprises a drawstring extending on the plurality of stations along the movement direction of the material frame and a plurality of shifting forks distributed on the drawstring at the positions corresponding to each station; the moving portion of the driving device is fixedly connected with the drawstring and can drive the drawstring to reciprocate; in one movement direction of the drawstring, the shifting forks are in a force transmission engagement with the material frames to drive the material frames to move, while in the other opposite movement direction of the drawstring, the shifting forks are released from the force transmission engagement with the material frame and no longer drive the material frames.

Preferably, the driving device is constructed as a cylinder-driven mechanism which comprises a front fixing plate and a rear fixing plate which form the fixing portion, a moving plate which forms the moving portion and is arranged between the front fixing plate and the rear fixing plate, a connecting arm which fixedly connects the moving plate with the drawstring, a cylinder which drives the moving plate to move, and a guiding assembly which guides the moving plate to move between the front fixing plate and the rear fixing plate;

Preferably, the conveying station mechanism comprises a bracket, bottom conveying wheels for supporting and conveying the material frames, a guiding wheel for limiting the material frames to enable the material frames to move forwards linearly, and a riding wheel for supporting the drawstring;

Preferably, the drawstring shifting fork mechanism comprises a bottom plate fixed on the drawstring, a pin shaft is fixed on the bottom plate, and the shifting fork can rotate around the pin shaft to be in the position in a force transmission engagement with the material frames or be in the position released from the force transmission engagement with the material frames.

Advantageously, only one of the plurality of conveying station mechanisms is equipped with the cylinder-driven mechanism, the multi-station conveying equipment is equipped with two sets of drawstring shifting fork mechanisms, two sides of the moving plate of the cylinder-driven mechanism are respectively welded with a connecting arm, and a drawstring of each drawstring shifting fork mechanism is respectively fixed with one connecting arm so as to drive the material frame from two sides of the material frame.

According to a specific design form, the cylinder-driven mechanism is mounted on the foremost conveying station mechanism, the front fixing plate in the cylinder-driven mechanism is welded or threaded fixed in front of the bracket of the conveying station mechanism, and the rear fixing plate in the cylinder-driven mechanism is welded or threaded fixed behind the bracket of the conveying station mechanism, the foremost ends of the drawstrings of two sets of drawstring shifting fork mechanisms are respectively fixed on the top surfaces of the connecting arms at the two sides of the moving plate of the cylinder-driven mechanism;

when the cylinder extends out, the material frame is driven to move forwards through the moving plate, the connecting arm, the drawstring and the shifting fork, so that the material frames on all the rear stations are driven to simultaneously move forwards one station; and when the cylinder retracts, the moving plate, the connecting arm and the drawstring are driven to move backwards, the shifting fork rotates around the pin shaft after touching the material frame, and the material frame is not driven, so that the position of the material frame keeps unchanged.

Regarding the cylinder-driven mechanism, according to a specific design form, the guide assembly consists of four guiding rods and four guiding sleeves, wherein two ends of the four guiding rods are fixed on the front fixing plate and the rear fixing plate through a threaded connection mode respectively, each guiding rod is fitted with one guiding sleeve, the four guiding sleeves are fixed on the moving plate through bolt fasteners, the cylinder body of the cylinder is fixed on the rear fixing plate, and the cylinder rod of the cylinder is fixed on the center hole of the moving plate through a bolt.

Regarding the conveying station mechanism, according to a specific design form, the bracket is formed by welding square tubes, two channel steels are welded on two sides of the top of the bracket, the bottom conveying wheels are fixed on side web plates of the channel steels, the interior of each bottom conveying wheel is assembled with a bearing so as to be able to rotate freely to support and convey the material frames placed on the bottom conveying wheels, the guiding wheels are fixed on upper flanges of the channel steels, the interior of each guiding wheel is assembled with a bearing so as to be able to rotate freely to limit and guide the side edges of the material frames, riding wheel bracket are welded on the channel steels, riding wheels are fixed on the riding wheel brackets, and the interior of each riding wheel is assembled with a bearing so as to be able rotate freely.

Regarding the drawstring shifting fork mechanism, according to a specific design form, the bottom plate is fixed on the drawstring through welding or threaded connection mode, the pin shaft is fixed on the bottom plate through threaded connection mode, a stop block is fixed on the bottom plate through welding or threaded connection mode, the shifting fork is machined with a round hole, the thickness of the shifting fork is equal to that of the stop block, the bottom surface of the shifting fork is fitted on the upper surface of the bottom plate after inserting the pin shaft into the round hole of the shifting fork for positioning, and the pin shaft is higher than the thickness of the shifting fork, so as to mount a stop component at the top of the pin shaft to prevent the shifting fork from coming out; under the state of completing assembly, the shifting fork is pre-tightened by a spring to abut against the stop block, the end portion of the shifting fork is machined with a threaded hole, and the stop block is machined with a threaded hole, the threaded holes on the end portion of the shifting fork and the stop block a bolt are respectively fitted with a bolt, and the two ends of the spring are respectively fixed on the two bolts; in a normal state of the shifting fork abutting against the stop block, the shifting fork is perpendicular to the drawstring and protrudes; when the drawstring moves forwards, the shifting fork is able to be in force transmission engagement with the material frame to push the material frame to move forwards, and when the drawstring moves backwards, the shifting fork overcomes the spring force to rotate around the pin shaft after contacting the material frame, and is released from the force transmission engagement with the material frame, so that the material frame is not driven; and once the shifting fork leaves the material frame, the shifting fork restores the state of being perpendicular to the drawstring and protruding under the action of the spring force.

According to the present application, a reciprocating drawstring type pneumatic synchronous conveying mechanism can be achieved, the present disclosure will be specifically described below with reference to the accompanying drawings: a reciprocating drawstring type pneumatic synchronous conveying mechanism, comprising a cylinder-driven mechanism, a drawstring shifting fork mechanism and a conveying station mechanism, wherein the cylinder-driven mechanism comprises a front fixing plate, connecting arms, guiding sleeves, a moving plate, guiding rods, a rear fixing plate and a cylinder; the drawstring shifting fork mechanism comprises a drawstring, a bottom plate, a pin shaft, a cotter pin, a spring, a stop block and a shifting fork; and the conveying station mechanism comprises a bracket, a channel steel, a riding wheel bracket, a riding wheel, a guiding wheel and a bottom conveying wheel.

In the cylinder-driven mechanism, two ends of four guiding rods are fixed on the front fixing plate and the rear fixing plate through a threaded connection mode respectively, each guiding rod is fitted with one guiding sleeve, the four guiding sleeves are fixed on the moving plate through bolt fasteners, the cylinder body of the cylinder is fixed on the rear fixing plate, the cylinder rod of the cylinder is fixed on the center hole of the moving plate through a bolt, and the two connecting arms are welded on two sides of the moving plate respectively.

In the drawstring shifting fork mechanism, the bottom plate is fixed on the drawstring through welding or threaded connection mode, the pin shaft is fixed on the bottom plate through threaded connection mode, and the stop block is fixed on the bottom plate through welding or threaded connection mode; the shifting fork is machined with a round hole, the thickness of the shifting fork is equal to the thickness of the stop block, the bottom surface of the shifting fork is fitted on the upper surface of the bottom plate after inserting the pin shaft into the round hole of the shifting fork for positioning, and the thickness of the pin shaft is 10 mm higher than the shifting fork; the top portion of the pin shaft is machined with a round hole, cotter is mounted in the round hole at the top portion of the pin shaft after inserting the shafting fork so as to prevent the shifting fork coming out. The end portion of the shifting fork is machined with a threaded hole, the stop block is machined with a threaded hole, the threaded holes on the end portion of the shifting fork and on the stop block are respectively fitted with a long bolt, and the two ends of the spring are respectively fixed on the two bolts. In a normal state, the spring contracts, so that the shifting fork is abutted against the stop block and is perpendicular to the drawstring, when the drawstring moves forwards, the shifting fork can push the material frame to move forwards, when the drawstring moves backwards, the shifting fork overcomes the spring force to rotate around the pin shaft after touching the material frame, the material frame is not driven, and when the shifting fork leaves the material frame, the shifting fork restores to be perpendicular to the drawstring under the tension of the spring.

In the conveying station mechanism, the bracket is formed by welding square tubes, two sides of the top of the bracket are welded with two channel steels, the riding wheel bracket is welded on the channel steels, the riding wheel is used for supporting the drawstring, the interior of the riding wheel is assembled with a bearing so as to rotate freely, and the riding wheel is fixed on the riding wheel bracket; the guiding wheel is used for limiting the material frame to enable the material frame to move forwards linearly, the interior of the guiding wheel is assembled with a bearing so as to rotate freely, and the guiding wheel is fixed above the channel steels; the bottom conveying wheel is used for supporting and conveying the material frame, the interior of the bottom conveying wheel is assembled with a bearing so as to rotate freely, and the bottom conveying wheel is fixed on the side face of the channel steels.

The cylinder-driven mechanism is mounted on the foremost conveying station mechanism, the front fixing plate in the cylinder-driven mechanism is welded or threaded fixed in front of the bracket of the conveying station mechanism, and the rear fixing plate in the cylinder-driven mechanism is welded or threaded fixed behind the bracket of the conveying station mechanism. The foremost ends of the drawstrings of two sets of drawstring shifting fork mechanisms are respectively fixed on the top surfaces of the connecting arms at the two sides of the cylinder-driven mechanism. When the cylinder extends out, the material frame is driven to move forwards through the moving plate, the connecting arm, the drawstring and the shifting fork, and when the cylinder retracts, the moving plate, the connecting arm and the drawstring are driven to move backwards, the shifting fork rotates around the pin shaft after touching the material frame, the material frame is not driven, and the position of the material frame keeps unchanged. Therefore, the cylinder extends out, the material frames on all the rear stations are driven to simultaneously move forwards one station by the drawstring shifting fork mechanism, and when the cylinder retracts, the material frames are kept in the original positions, and the cylinder extends out again to drive the material frames to simultaneously move forwards one station again when the staying time is up.

In some embodiments, both the drawstring and the shifting fork in the drawstring shifting fork mechanism are made of aluminum materials, and the bracket in the conveying station mechanism is made of stainless steel materials.

It can be seen that the present disclosure provides a reciprocating drawstring type pneumatic synchronous conveying mechanism which comprises a cylinder-driven mechanism, a drawstring shifting fork mechanism and a conveying station mechanism, wherein the drawstring shifting fork mechanism is driven to reciprocate through the extending out and retraction of the cylinder, so as to drive a material frame to move forwards at the same time. The electric system and the mechanical system in the existing conveying mechanism are simplified, the manufacturing cost and the energy consumption of the equipment are reduced, fault points are reduced, and meanwhile, the working efficiency is improved by synchronous conveying.

BRIEF DESCRIPTION OF THE DRAWINGS

In order to more clearly explain the technical solutions in the embodiments of the present application, the drawings that are needed in the description of the embodiments are briefly introduced below, and it is obvious that the drawings in the following description are some embodiments of the present application, and a person skilled in the art can also obtain other drawings according to the drawings without making inventive effort.

Figure 1:
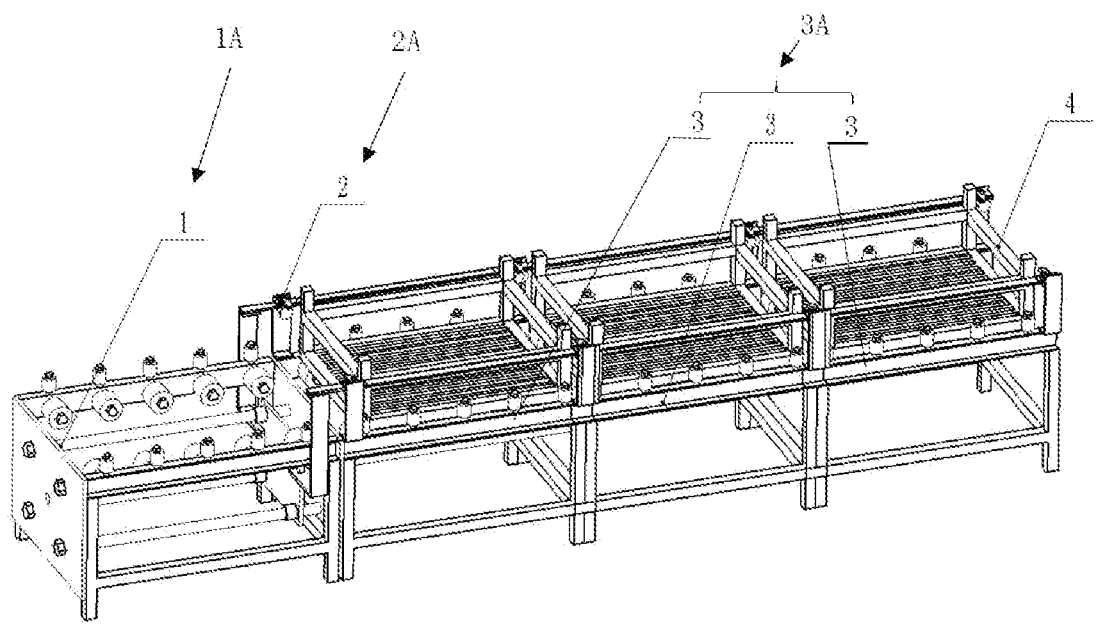
FIG. 1 is a schematic view of a reciprocating drawstring type pneumatic synchronous conveying mechanism of the present disclosure.
Figure 2:
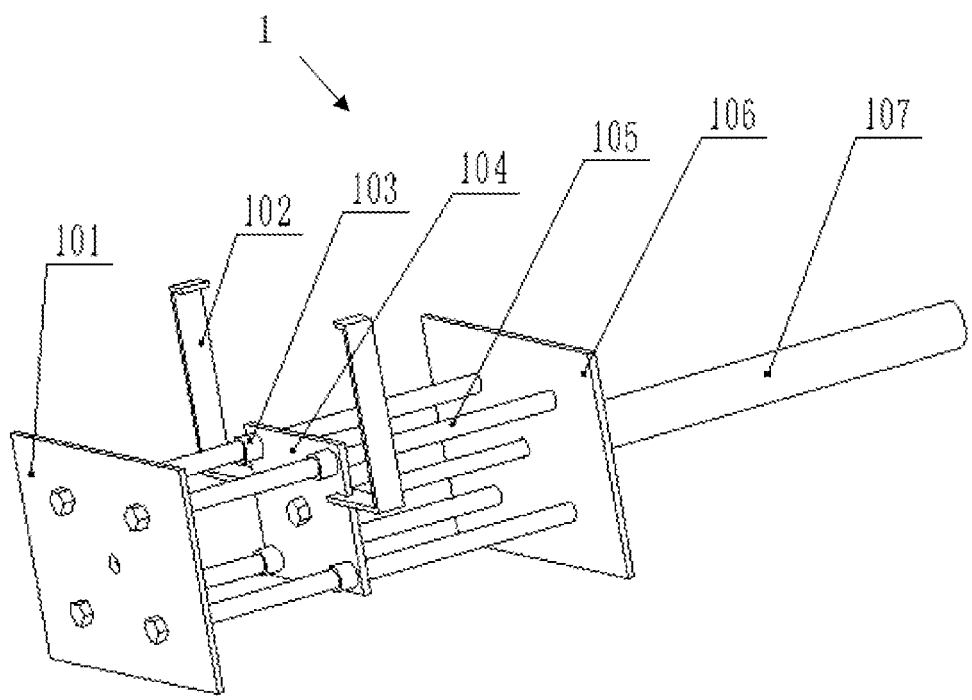
FIG. 2 is a schematic view of the cylinder-driven mechanism of the present disclosure.
Figure 3:
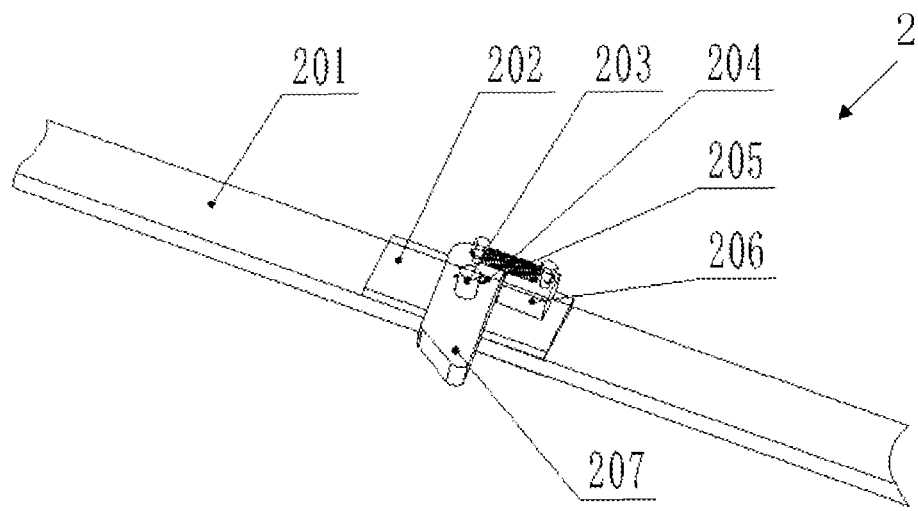
FIG. 3 is a schematic view of a drawstring shifting fork mechanism of the present disclosure.
Figure 4:
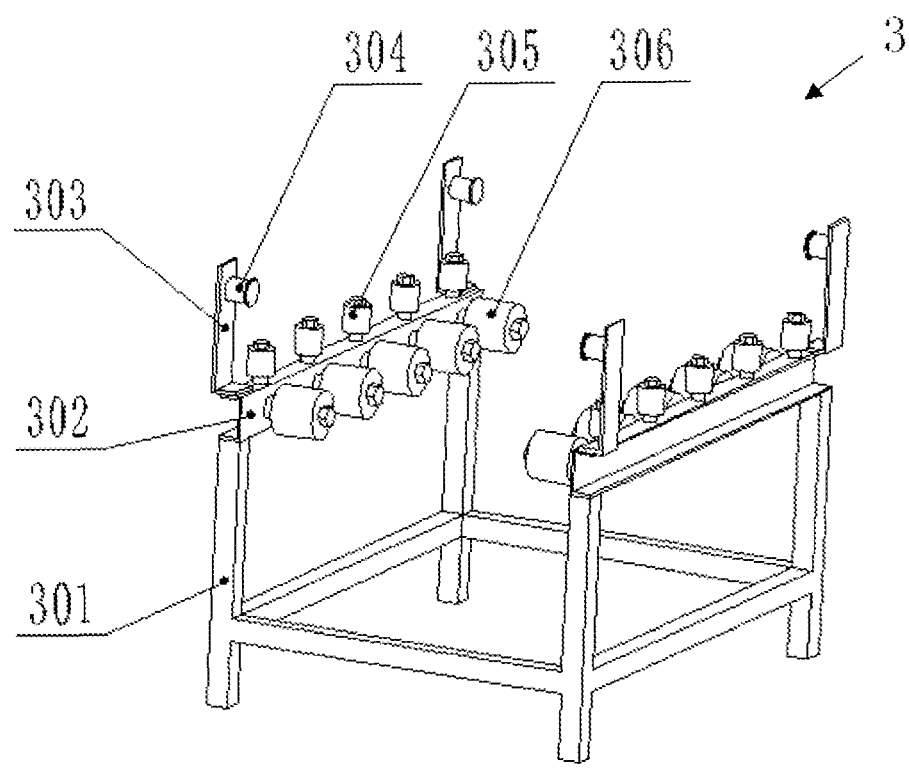
FIG. 4 is a schematic view of the conveying station mechanism of the present disclosure.
Figure 5:
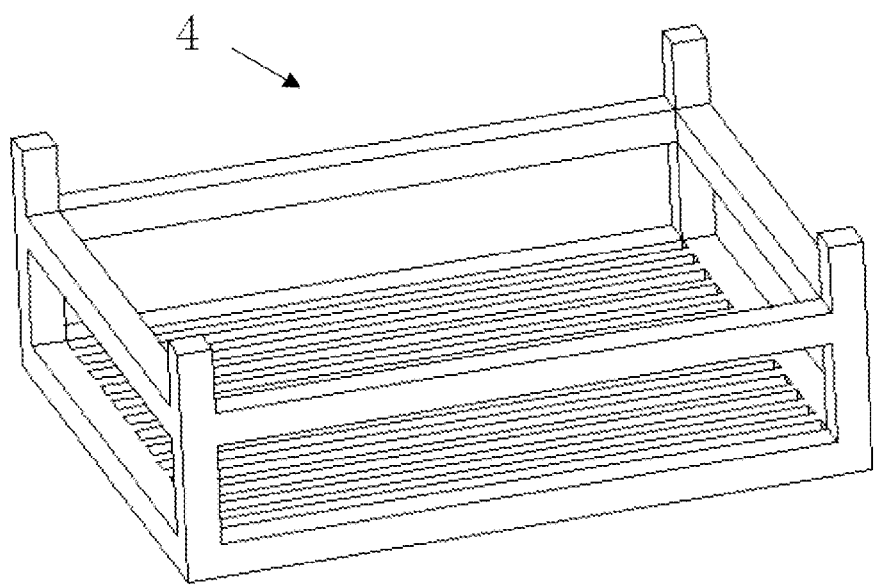
FIG. 5 is a schematic view of a material frame.

wherein: 1A—driving device, 1—cylinder-driven mechanism, 2A—conveyance coupling device, 2—drawstring shifting fork mechanism, 3A—station combining device, 3—conveying station mechanism, 4—material frame, 101—front fixing plate, 102—connecting arm, 103—guiding sleeve, 104—moving plate, 105—guiding rod, 106—rear fixing plate, 107—cylinder, 201—drawstring, 202—bottom plate, 203—pin shaft, 204—cotter pin, 205—spring, 206—stop block, 207—shifting fork, 301—bracket, 302—channel steel, 303—riding wheel bracket, 304—riding wheel, 305—guiding wheel, and 306—bottom conveying wheel.

DETAILED DESCRIPTION

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

The application provides a multi-station conveying equipment, including a driving device, a conveyance coupling device and a station combining device, the station combining device includes a plurality of conveying station mechanisms 3 arranged side by side in proper order corresponding to a plurality of stations, wherein each conveying station mechanism is suitable for placing and supporting a material frame 4; the driving device has a fixing portion fixed relative to the conveying station mechanism and a moving portion reciprocable relative to the fixing portion, and the moving portion can drive a plurality of material frames on the plurality of conveying station mechanisms to move synchronously through the conveyance coupling device; the conveyance coupling device comprises at least one set of drawstring shifting fork mechanism 2, wherein the drawstring shifting fork mechanism comprises a drawstring 201 extending on the plurality of stations along the movement direction of the material frame and a plurality of shifting forks 207 distributed on the drawstring at the positions corresponding to each station; the moving portion of the driving device is fixedly connected with the drawstring and can drive the drawstring to reciprocate; in one movement direction of the drawstring, the shifting forks are in a force transmission engagement with the material frames to drive the material frames to move, while in the other opposite movement direction of the drawstring, the shifting forks are released from the force transmission engagement with the material frame and no longer drive the material frames.

Embodiment 1

Embodiment 1 of the present disclosure will be specifically described below with reference to the accompanying drawings: a reciprocating drawstring type pneumatic synchronous conveying mechanism, comprising a cylinder-driven mechanism, a drawstring shifting fork mechanism and a conveying station mechanism, wherein the cylinder-driven mechanism comprises a front fixing plate, connecting arms, guiding sleeves, a moving plate, guiding rods, a rear fixing plate and a cylinder; the drawstring shifting fork mechanism comprises a drawstring, a bottom plate, a pin shaft, a cotter pin, a spring, a stop block and a shifting fork; and the conveying station mechanism comprises a bracket, a channel steel, a riding wheel bracket, a riding wheel, a guiding wheel and a bottom conveying wheel.

In the cylinder-driven mechanism, two ends of four guiding rods are fixed on the front fixing plate and the rear fixing plate through a threaded connection mode respectively, each guiding rod is fitted with one guiding sleeve, the four guiding sleeves are fixed on the moving plate through bolt fasteners, the cylinder body of the cylinder is fixed on the rear fixing plate, the cylinder rod of the cylinder is fixed on the center hole of the moving plate through a bolt, and the two connecting arms are welded on two sides of the moving plate respectively.

In the drawstring shifting fork mechanism, the bottom plate is fixed on the drawstring through welding or threaded connection mode, the pin shaft is fixed on the bottom plate through threaded connection mode, and the stop block is fixed on the bottom plate through welding or threaded connection mode; the shifting fork is machined with a round hole, the thickness of the shifting fork is equal to the thickness of the stop block, the bottom surface of the shifting fork is fitted on the upper surface of the bottom plate after inserting the pin shaft into the round hole of the shifting fork for positioning, and the thickness of the pin shaft is 10 mm higher than the shifting fork; the top portion of the pin shaft is machined with a round hole, cotter is mounted in the round hole at the top portion of the pin shaft after inserting the shafting fork so as to prevent the shifting fork coming out. The end portion of the shifting fork is machined with a threaded hole, the stop block is machined with a threaded hole, the threaded holes on the end portion of the shifting fork and on the stop block are respectively fitted with a long bolt, and the two ends of the spring are respectively fixed on the two bolts. In a normal state, the spring contracts, so that the shifting fork is abutted against the stop block and is perpendicular to the drawstring, when the drawstring moves forwards, the shifting fork can push the material frame to move forwards, when the drawstring moves backwards, the shifting fork overcomes the spring force to rotate around the pin shaft after touching the material frame, the material frame is not driven, and when the shifting fork leaves the material frame, the shifting fork restores to be perpendicular to the drawstring under the tension of the spring.

In the conveying station mechanism, the bracket is formed by welding square tubes, two sides of the top of the bracket are welded with two channel steels, the riding wheel bracket is welded on the channel steels, the riding wheel is used for supporting the drawstring, the interior of the riding wheel is assembled with a bearing so as to rotate freely, and the riding wheel is fixed on the riding wheel bracket; the guiding wheel is used for limiting the material frame to enable the material frame to move forwards linearly, the interior of the guiding wheel is assembled with a bearing so as to rotate freely, and the guiding wheel is fixed above the channel steels; the bottom conveying wheel is used for supporting and conveying the material frame, the interior of the bottom conveying wheel is assembled with a bearing so as to rotate freely, and the bottom conveying wheel is fixed on the side face of the channel steels.

The cylinder-driven mechanism is mounted on the foremost conveying station mechanism, the front fixing plate in the cylinder-driven mechanism is welded or threaded fixed in front of the bracket of the conveying station mechanism, and the rear fixing plate in the cylinder-driven mechanism is welded or threaded fixed behind the bracket of the conveying station mechanism. The foremost ends of the drawstrings of two sets of drawstring shifting fork mechanisms are respectively fixed on the top surfaces of the connecting arms at the two sides of the cylinder-driven mechanism. When the cylinder extends out, the material frame is driven to move forwards through the moving plate, the connecting arm, the drawstring and the shifting fork, and when the cylinder retracts, the moving plate, the connecting arm and the drawstring are driven to move backwards, the shifting fork rotates around the pin shaft after touching the material frame, the material frame is not driven, and the position of the material frame keeps unchanged. Therefore, the cylinder extends out, the material frames on all the rear stations are driven to simultaneously move forwards one station by the drawstring shifting fork mechanism, and when the cylinder retracts, the material frames are kept in the original positions, and the cylinder extends out again to drive the material frames to simultaneously move forwards one station again when the staying time is up.

In some embodiments, both the drawstring and the shifting fork in the drawstring shifting fork mechanism are made of aluminum materials, and the bracket in the conveying station mechanism is made of stainless steel materials.

It can be seen that the present disclosure provides a reciprocating drawstring type pneumatic synchronous conveying mechanism which comprises a cylinder-driven mechanism, a drawstring shifting fork mechanism and a conveying station mechanism, wherein the drawstring shifting fork mechanism is driven to reciprocate through the extending out and retraction of the cylinder, so as to drive a material frame to move forwards at the same time. The electric system and the mechanical system in the existing conveying mechanism are simplified, the manufacturing cost and the energy consumption of the equipment are reduced, fault points are reduced, and meanwhile, the working efficiency is improved by synchronous conveying.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

What is claimed is:

1. A multi-station conveying equipment, including a driving device, a conveyance coupling device, and a station combining device, wherein:

the station combining device includes a plurality of conveying station mechanisms arranged side by side in proper order corresponding to a plurality of stations, wherein each conveying station mechanism is suitable for placing and supporting a material frame;

the driving device has a fixing portion fixed relative to the conveying station mechanism and a moving portion reciprocable relative to the fixing portion, and the moving portion can drive a plurality of material frames on the plurality of conveying station mechanisms to move synchronously through the conveyance coupling device; and the conveyance coupling device comprises at least one set of drawstring shifting fork mechanism, wherein the drawstring shifting fork mechanism comprises a drawstring extending on the plurality of stations along the movement direction of the material frame and a plurality of shifting forks distributed on the drawstring at the positions corresponding to each station; the moving portion of the driving device is fixedly connected with the drawstring and can drive the drawstring to reciprocate; in one movement direction of the drawstring, the shifting forks are in a force transmission engagement with the material frames to drive the material frames to move, while in the other opposite movement direction of the drawstring, the shifting forks are released from the force transmission engagement with the material frame and no longer drive the material frames;

wherein the driving device is constructed as a cylinder-driven mechanism which comprises a front fixing plate and a rear fixing plate which form the fixing portion, a moving plate which forms the moving portion and is arranged between the front fixing plate and the rear fixing plate, a connecting arm which fixedly connects the moving plate with the drawstring, a cylinder which drives the moving plate to move, and a guiding assembly which guides the moving plate to move between the front fixing plate and the rear fixing plate;

the conveying station mechanism comprises a bracket, bottom conveying wheels for supporting and conveying the material frames, a guiding wheel for limiting the material frames to enable the material frames to move forwards linearly, and a riding wheel for supporting the drawstring; and the drawstring shifting fork mechanism comprises a bottom plate fixed on the drawstring, a pin shaft is fixed on the bottom plate, and the shifting fork can rotate around the pin shaft to be in the position in a force transmission engagement with the material frames or be in the position released from the force transmission engagement with the material frames;

and wherein only one of the plurality of conveying station mechanisms is equipped with the cylinder-driven mechanism, the multi-station conveying equipment is equipped with two sets of drawstring shifting fork mechanisms, two sides of the moving plate of the cylinder-driven mechanism are respectively welded with a connecting arm, and a drawstring of each drawstring shifting fork mechanism is respectively fixed with one connecting arm so as to drive the material frame from two sides of the material frame.

2. The multi-station transfer equipment according to claim 1, wherein the cylinder-driven mechanism is mounted on the foremost conveying station mechanism, the front fixing plate in the cylinder-driven mechanism is welded or threaded fixed in front of the bracket of the conveying station mechanism, and the rear fixing plate in the cylinder-driven mechanism is welded or threaded fixed behind the bracket of the conveying station mechanism, the foremost ends of the drawstrings of two sets of drawstring shifting fork mechanisms are respectively fixed on the top surfaces of the connecting arms at the two sides of the moving plate of the cylinder-driven mechanism; when the cylinder extends out, the material frame is driven to move forwards through the moving plate, the connecting arm, the drawstring and the shifting fork, so that the material frames on all the rear stations are driven to simultaneously move forwards one station; and when the cylinder retracts, the moving plate, the connecting arm and the drawstring are driven to move backwards, the shifting fork rotates around the pin shaft after touching the material frame, and the material frame is not driven, so that the position of the material frame keeps unchanged.

3. The multi-station transfer equipment according to claim 1, wherein in the cylinder-driven mechanism, the guide assembly consists of four guiding rods and four guiding sleeves, wherein two ends of the four guiding rods are fixed on the front fixing plate and the rear fixing plate through a threaded connection mode respectively, each guiding rod is fitted with one guiding sleeve, the four guiding sleeves are fixed on the moving plate through bolt fasteners, the cylinder body of the cylinder is fixed on the rear fixing plate, and the cylinder rod of the cylinder is fixed on the center hole of the moving plate through a bolt.

4. The multi-station transfer equipment according to claim 1, wherein in the conveying station mechanism, the bracket is formed by welding square tubes, two channel steels are welded on two sides of the top of the bracket, the bottom conveying wheels are fixed on side web plates of the channel steels, the interior of each bottom conveying wheel is assembled with a bearing so as to be able to rotate freely to support and convey the material frames placed on the bottom conveying wheels, the guiding wheels are fixed on upper flanges of the channel steels, the interior of each guiding wheel is assembled with a bearing so as to be able to rotate freely to limit and guide the side edges of the material frames, riding wheel bracket are welded on the channel steels, riding wheels are fixed on the riding wheel brackets, and the interior of each riding wheel is assembled with a bearing so as to be able rotate freely.

5. The multi-station transfer equipment according to claim 1, wherein in the drawstring shifting fork mechanism, the bottom plate is fixed on the drawstring through welding or threaded connection mode, the pin shaft is fixed on the bottom plate through threaded connection mode, a stop block is fixed on the bottom plate through welding or threaded connection mode, the shifting fork is machined with a round hole, the thickness of the shifting fork is equal to that of the stop block, the bottom surface of the shifting fork is fitted on the upper surface of the bottom plate after inserting the pin shaft into the round hole of the shifting fork for positioning, and the pin shaft is higher than the thickness of the shifting fork, so as to mount a stop component at the top of the pin shaft to prevent the shifting fork from coming out; under the state of completing assembly, the shifting fork is pre-tightened by a spring to abut against the stop block, the end portion of the shifting fork is machined with a threaded hole, and the stop block is machined with a threaded hole, the threaded holes on the end portion of the shifting fork and the stop block a bolt are respectively fitted with a bolt, and the two ends of the spring are respectively fixed on the two bolts; in a normal state of the shifting fork abutting against the stop block, the shifting fork is perpendicular to the drawstring and protrudes; when the drawstring moves forwards, the shifting fork is able to be in force transmission engagement with the material frame to push the material frame to move forwards, and when the drawstring moves backwards, the shifting fork overcomes the spring force to rotate around the pin shaft after contacting the material frame, and is released from the force transmission engagement with the material frame, so that the material frame is not driven; and once the shifting fork leaves the material frame, the shifting fork restores the state of being perpendicular to the drawstring and protruding under the action of the spring force.

* * * * *